April 17, 1951     J. G. WALLNY     2,549,729
ENDLESS BELT FILTER

Filed Dec. 2, 1947     3 Sheets-Sheet 1

April 17, 1951 J. G. WALLNY 2,549,729
ENDLESS BELT FILTER
Filed Dec. 2, 1947 3 Sheets-Sheet 2

Patented Apr. 17, 1951

2,549,729

UNITED STATES PATENT OFFICE 2,549,729

ENDLESS BELT FILTER

John Gunnar Wallny, Landskrona, Sweden

Application December 2, 1947, Serial No. 789,149
In Sweden December 14, 1946

3 Claims. (Cl. 210—197)

The present invention relates to continuous filters as used for industrial filtering and washing purposes, and more particularly to such continuous filters, so-called band filters, in which the continuous filtering or washing operation takes place on the upper run of an endless conveyor belt of relatively large width, passing over pulleys at both ends of the filter, and in which the upper run of the conveyor belt travels over and is partly supported on stationary suction boxes under the intermediary of preferably only one or a small number of endless traction belts of relatively narrow width, sliding with their upper runs on the suction boxes and passing over wheels coaxial with said pulleys, said traction belts being provided with apertures through which they connect the suction boxes with drainage openings in the conveyor belt during the travel of said belts over the suction boxes. In other terms the invention relates to band filters of the type disclosed in the U. S. patent specification No. 2,314,294.

The invention has for its object to improve band filters of the type referred to above by removing certain drawbacks of the same in their hitherto known forms, which drawbacks have manifested themselves in the difficulties of enabling the traction belt or belts to withstand the arising stresses and of maintaining the necessary sealing of said traction belt or belts in relation to the conveyor belt during the travel of said belts over the stationary suction boxes. According to the invention it has been found that these drawbacks were due to slips occurring between the contacting surfaces of the traction belt or belts and the conveyor belt and to wear and tear in said surfaces during the travel of said belts over the suction boxes. The invention consists in establishing the causes of these slips and the wear and tear caused thereby and in avoiding these causes by means of a suitable arrangement which is principally characterized by the fact that the pulleys over which the conveyor belt passes are freely rotatable about their axes and have a diameter which, in relation to the wheels which are coaxial with said pulleys and over which the traction belt or belts pass, is chosen in such a manner that said pulleys hold the conveyor belt passing over them out of frictional coupling engagement with the traction belt or belts where said belt or belts and the conveyor belt pass over said wheels and pulleys, respectively. By this arrangement the advantage is obtained that a frictional coupling engagement of the conveyor belt with the traction belt or belts is obtained only on the straight travel of the belts over the suction boxes and that no essential coupling action whatever, neither direct nor indirect, arises between the traction belt or belts and the conveyor belt where said belts pass over the wheels and pulleys, respectively. Owing to the necessary difference of diameter between the pulleys and the wheels said pulleys and wheels must tend to move, when a direct or indirect coupling action exists between them, at different peripheral speeds, a fact which was one of the causes of the slips, occurring in the hitherto known constructions of band filters, between the conveyor belt and the traction belt or belts on the straight travel of said belts over the suction boxes. In order that the slips thus occurring between the conveyor belt and the traction belt or belts during their travel over the suction boxes should have the slightest possible influence on the necessary sealing of the traction belt or belts in relation to the conveyor belt, the traction belt or belts of the known forms had longitudinal and transversal resilient sealing ribs of soft rubber for bearing against the underside of the conveyor belt. Said sealing ribs which offered to the conveyor belts a contact surface amounting to less than 10% of the area of top surface of the traction belt or belts, were subjected to very high specific stresses to which they could yield, it is true, but under the influence of which they were torn off relatively rapidly. It has proved that the arrangement according to the invention makes these resilient sealing ribs superfluous, and by the elimination of these sealing ribs the contact surface of the traction belt or belts with the conveyor belt is increased approximately to half or more of the area of the top surface of the traction belt or belts, and the specific stresses exerted on the rubber in this contact surface are correspondingly reduced. The reduced specific stresses exerted on the rubber in the contact surface of the traction belt or belts with the conveyor belt diminish the risk of the rubber forming this contact surface being torn off, and simultaneously improves the frictional coupling engagement of the conveyor belt with the traction belt or belts on the straight travel of said belts over the suction boxes. This improved frictional coupling engagement in turn contributes to preventing slips between the traction belt or belts and the conveyor belt during their travel over the suction boxes, a fact which in turn contributes to a sparing of the rubber forming the contact surfaces of the traction belt or belts with the conveyor belt and makes it possible to transmit to the conveyor belt the traction power necessary for moving said conveyor belt exclusively by means of the traction belt or belts, i. e. without the intermediary of a driving from any of the pulleys over which the conveyor belt passes, so that the driving can take place exclusively by means of the wheel or wheels over which the traction belt or belts pass at that end of the filter towards which the upper runs of the conveyor belt and traction belt or belts travel.

The nature and the characteristic features of the invention will be made apparent more in detail from the following description of an embodiment thereof, reference being had to the accompanying drawings, in which.

Figure 2:
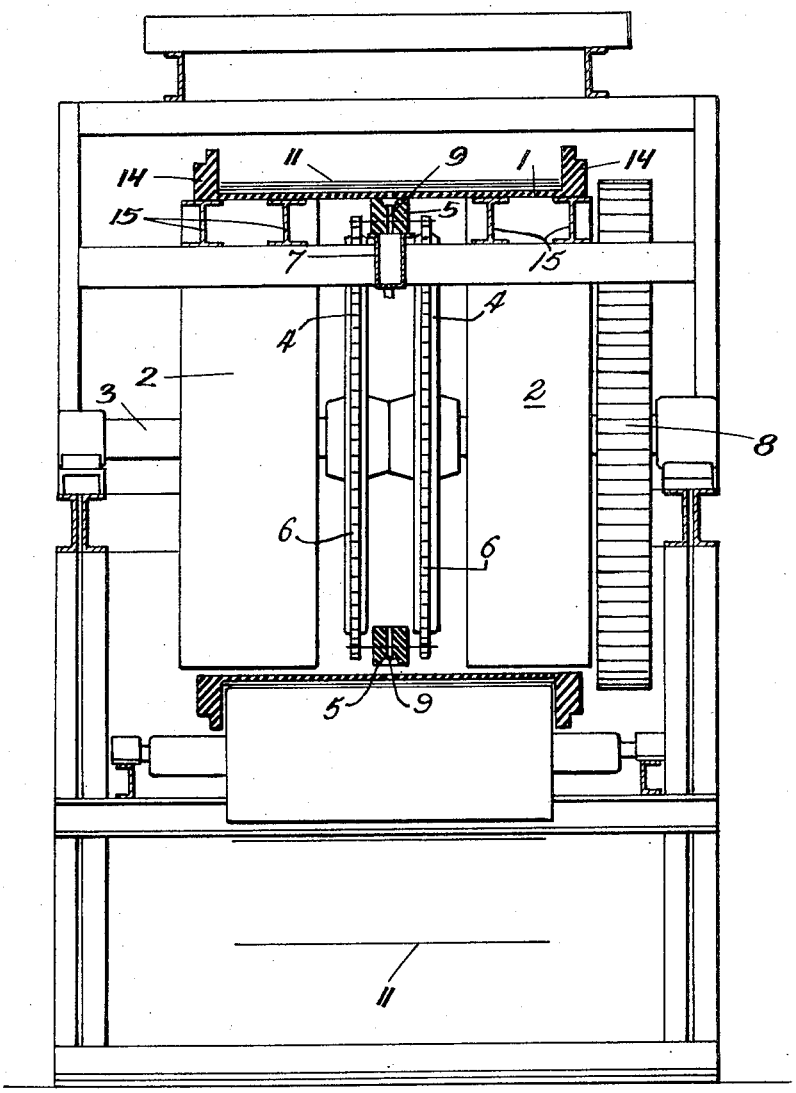
Fig. 2 is a section, on a larger scale, on the line II—II in Fig. 1.
Figure 4:
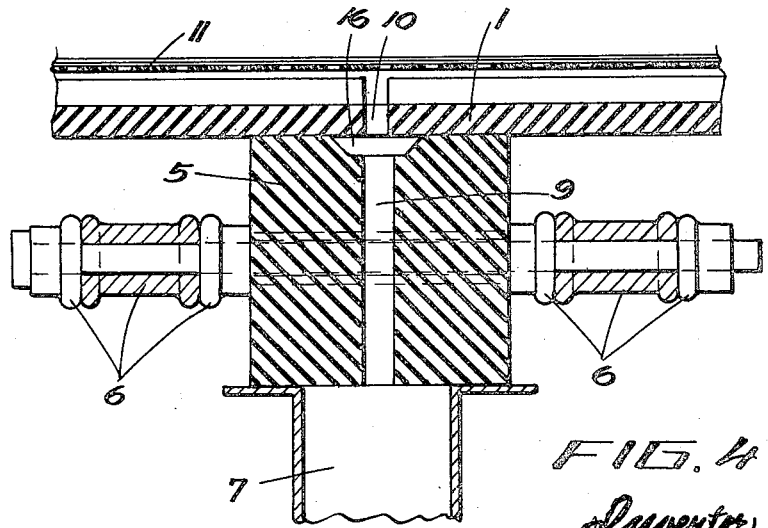

Fig. 4, on a still larger scale, shows certain details of the section in Fig. 2.

Fig. 5 is a plan view of a fragment of the traction belt.

Figure 1:
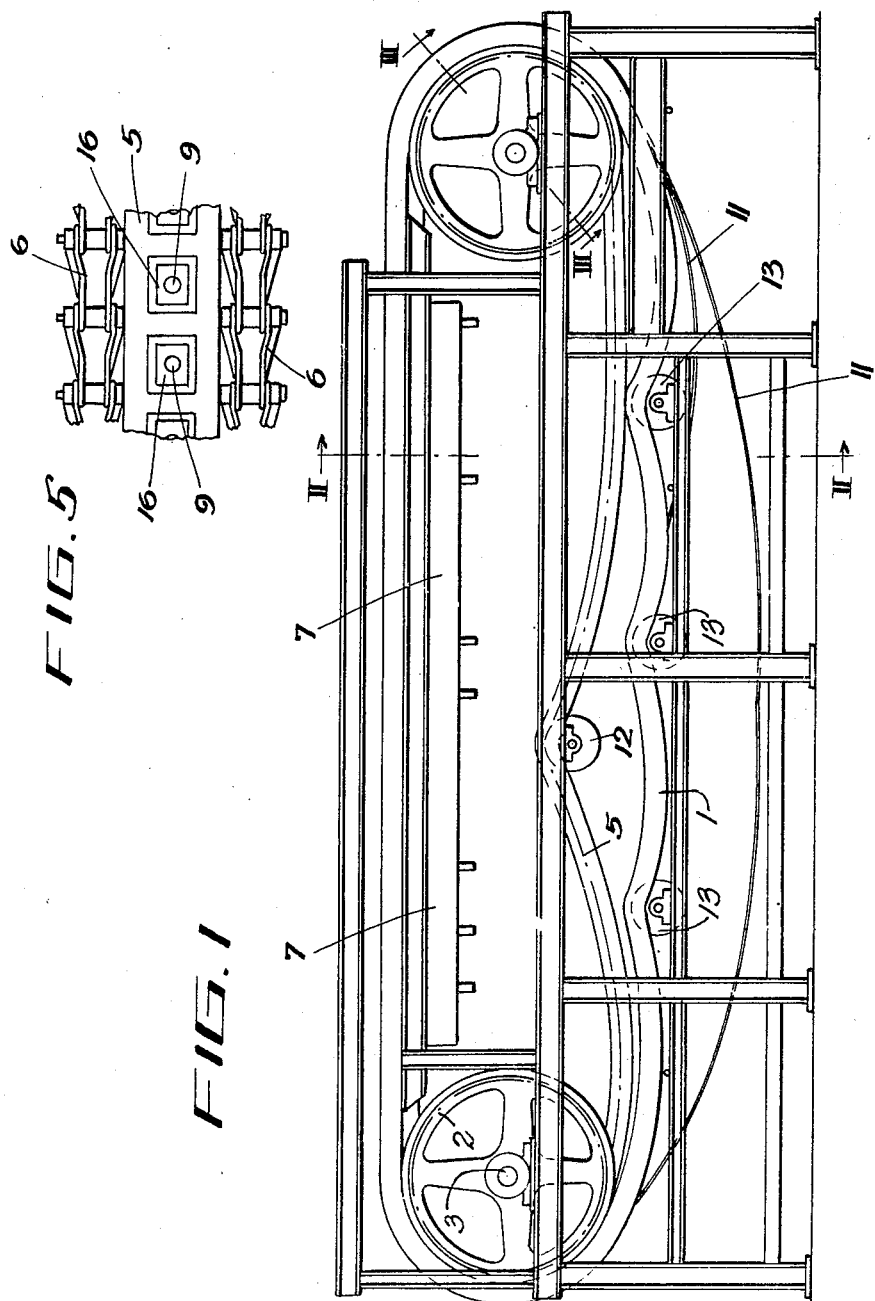
Fig. 1 is a side view of the band filter.
Figure 3:
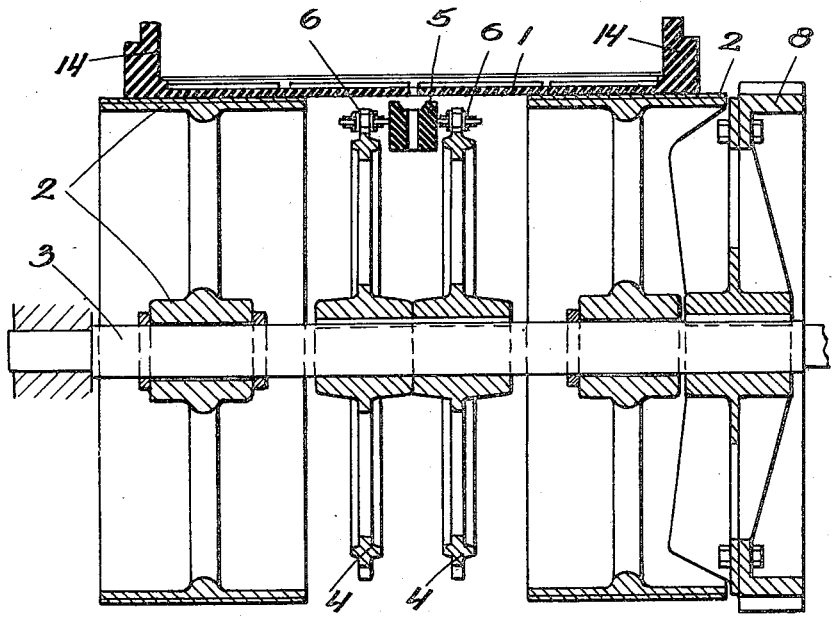
Fig. 3 is a section, on a still larger scale, on the line III—III in Fig. 1.

In the drawings 1 designates the conveyor belt and 2 the pulleys over which the conveyor belt passes at both ends of the filter. The pulleys 2 are freely rotatably mounted on shafts 3 which between the pulleys 2 carry sprocket wheels 4 over which reinforcing chains 6 pass which are arranged in a known manner on both sides of the traction belt 5. The shafts 3 are journalled in a suitable frame in which also the suction boxes 7 are arranged, over which the upper runs of the conveyor belt 1 and the traction belt 5 pass in the direction from the one end of the filter to the other end thereof. The shaft 3 at the latter end of the filter is provided with a toothed wheel 8 (Figs. 2 and 3) through which the driving power is transmitted to this shaft and to the sprocket wheels 4 mounted thereon which wheels advance the traction belt 5 by means of their engagement with the chains 6 of said belt. The upper run of the relatively wide conveyor belt 1, travelling between the pulleys at the two ends of the filter, is supported partly on the suction boxes 7 by the upper run of the relatively narrow traction belt 5, sliding on said suction boxes. The traction belt 5 has apertures 9 (Fig. 4) through which it brings the suction boxes 7 into communication with drainage openings 10 in the conveyor belt 1 during the travel of said belts over the suction boxes. For this purpose the upper run of the traction belt 5 is adapted to make a seal partly between its bottom or inner surface and the upper side of the suction boxes 7 serving as a sliding surface for said upper run, partly between its top surface and the underside of the upper run of the conveyor belt 1 driven by the traction belt 5 by means of its frictional coupling engagement with said belt. According to the invention the frictional coupling engagement of the conveyor belt 1 with the traction belt 5 is limited to the straight travel of the conveyor belt 1 and the traction belt 5 over the suction boxes 7. Moreover, according to the invention there is no essential coupling action, neither direct nor indirect, between the conveyor belt 1 and the traction belt 5 other than that due to said frictional engagement of the conveyor belt with the traction belt 5 during their travel over the suction boxes 7. This results from the pulleys 2 partly being freely rotatable about their shafts, i. e. they rotate independently of the wheels 4, partly having a diameter chosen in such a manner in relation to the wheels 4 that, as appears from Fig. 3, they hold the conveyor belt 1 out of frictional coupling engagement with the traction belt 5 where the conveyor belt 1 and the traction belt 5 pass over the pulleys 2 and the wheels 4, respectively. The lower returning runs of the traction belt 5, of the conveyor belt 1 and of one or more filter cloths 11 or the like arranged around the conveyor belt are held in spaced relationship, e. g. in order to be readily available for rinsing purposes, by the traction belt 5 and the conveyor belt 1 and, if desired, one or more of the filter cloths being passed over suitably arranged supporting rollers 12 and 13, respectively (Fig. 1).

The traction belt 5, anchored in a known manner at close intervals to the practically unelastic chains 6, and the conveyor belt are generally made of rubber preferably reinforced by means of fabric inserts, and the conveyor belt 1 is of a channel-shaped transverse section owing to the fact that it is provided at its edges with side edgings or borders 14 or the like forming the side walls of the channel. The conveyor belt channel is provided at its bottom with a suitable drainage in the form of a cellular or channel system. The upper run of the conveyor belt, which is loaded with the material to be filtered or washed and on which the filtering or washing operation takes place, reposes and slides with its portions lying outside of the width of the relatively narrow traction belt 5 on fixed sliding surfaces formed by beams 15 (Figs. 1 and 2) or in another suitable manner. The friction between the conveyor belt 1 and the sliding surfaces or the like formed by the fixed beams 15 must be appreciably less than the friction between the conveyor belt 1 and the traction belt 5, and the coupling between the conveyor belt 1 and the traction belt 5 due to the friction therebetween should be sufficiently firm for practically preventing slips between said belts. The desired firmness of the frictional coupling engagment of the conveyor belt 1 with the traction belt 5 can be obtained according to the invention by the fact that the contact surface of the traction belt 5 with the conveyor belt 1 on the straight travel over the suction boxes 7 is increased from the 10% hitherto generally occuring to approximately 50% or more of the area of the top surface of the traction belt on said straight travel. Such an increase of the contact surface of the traction belt with the conveyor belt makes it possible to dispense with all sealing ribs on the side of the traction belt facing the conveyor belt and to distribute the frictional engagement between the traction and conveyor belts over the greater part of the area of this side, that is with deduction only of that part of the area falling to the preferably somewhat widened upper ends 16 of the apertures 9 (Figs. 4 and 5). Even at a relatively small area of the widened upper ends 16 of the apertures 9 there is obtained a correct connection of the drainage openings 10 of the conveyor belt 1 with the suction boxes 7 through the apertures 9 of the traction belt 5 since the frictional coupling engagement between the conveyor 1 and the traction belt 5 is sufficiently firm for practically preventing slips between them. The necessary high friction between the conveyor belt 1 and the traction belt 5 during their travel over the suction boxes 7 is ensured partly by the choice of material for the conveyor belt 1 and the traction belt 5, partly by the contact pressure of the conveyor belt 1 against the traction belt 5, which pressure is increased by the vacuum in the suction boxes. This contact pressure increased by the vacuum in the suction boxes simultaneously contributes to the necessary sealing of the traction belt 5 and the conveyor belt 1 around the widened upper ends 16 of the apertures 9 and the openings 10 communicating through said apertures 9 with the suction boxes 7.

What I claim and desire to secure by Letters Patent is:

1. A filtering or washing apparatus comprising, in combination, a stationary elongated suction box structure, wheels disposed beyond the ends of the suction box structure, an endless traction belt of relatively small width, running over said wheels and sliding on its upper run on the suction box structure longitudinally thereof, means for driving said traction belt by imparting rotary motion to one of the wheels over which it is running, freely rotatable pulleys coaxial with said wheels, an endless conveyor belt of relatively large width, running over said pulleys and reposing on its upper run on the upper run of the traction belt in frictional engagement therewith, said traction and conveyor belts having openings for draining the upper run of the conveyor belt to the suction box structure, said freely rotatable pulleys for the conveyor belt being of a larger diameter than the diameter of said wheels for said traction belt and holding the conveyor belt out of frictional coupling contact with the traction belt when said traction belt and said conveyor belt pass over the coaxial wheels and freely rotatable pulleys, respectively.

2. A filtering or washing apparatus as claimed in claim 1, in which the facing sides of the conveyor and traction belts have frictional coupling contact with each other only at the upper runs passing over the suction box structure, the contact surface of the upper run of the traction belt with the facing side of the conveyor belt being not less than half the area of the side of the upper run of the traction belt facing the conveyor belt to render the frictional coupling between the upper runs of the two belts sufficiently firm to prevent slipping between the contacting surfaces of the upper runs of the two belts in normal operation of the apparatus.

3. In filtering or washing apparatus, an elongated suction box structure, wheels rotatably mounted horizontally at each end of said suction box structure, an endless traction belt of relatively small width passing around said wheels, the upper portion of said traction belt being in sliding contact with the upper surface of said suction box, means for driving one said wheel for moving said belt over said suction box, freely rotatable pulleys of greater diameter than said wheels coaxial with said wheels, an endless conveyor belt of substantially greater width than said traction belt passing around said pulleys and being superimposed on and in frictional contact with said traction belt in the region of said suction box, said traction belt driving said conveyor belt by said frictional contact, said traction belt and said conveyor belt having openings therein providing drainage from said conveyor belt to said suction box, said conveyor belt being maintained out of contact with said traction belt out of the region of said suction box by said greater diameter pulleys.

JOHN GUNNAR WALLNY.

REFERENCES CITED

The following references are of record in the file of this patent:

UNITED STATES PATENTS

| Number | Name | Date |
| --- | --- | --- |
| 780,145 | Vaugham | Jan. 17, 1905 |
| 957,558 | Hiltner | May 10, 1910 |
| 1,626,041 | Kyle et al. | Apr. 26, 1927 |
| 2,094,350 | Cartigny | Sept. 28, 1937 |
| 2,314,294 | Wallny | Mar. 16, 1943 |
| 2,377,252 | Lehrecke | May 29, 1945 |